United States Patent
Hsiao et al.

(10) Patent No.: US 7,549,215 B2
(45) Date of Patent: Jun. 23, 2009

(54) METHOD FOR MANUFACTURING A MAGNETIC HEAD FOR PERPENDICULAR MAGNETIC DATA RECORDING

(75) Inventors: Wen-Chien David Hsiao, San Jose, CA (US); Michael Ming Hsiang Yang, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/692,841

(22) Filed: Mar. 28, 2007

(65) Prior Publication Data
US 2008/0235938 A1 Oct. 2, 2008

(51) Int. Cl.
*G11B 5/127* (2006.01)
*H04R 31/00* (2006.01)

(52) U.S. Cl. .............. 29/603.14; 29/603.09; 29/603.13; 29/605; 29/606; 324/210; 324/212; 360/31; 360/121; 360/317; 427/127; 427/128

(58) Field of Classification Search .............. 29/603.09, 29/603.13, 603.14, 605, 606; 360/31, 121, 360/122, 317; 324/210, 212; 427/127, 128
See application file for complete search history.

(56) References Cited

U.S. PATENT DOCUMENTS

| | | | | |
|---|---|---|---|---|
| 3,753,093 | A | * 8/1973 | Gardner et al. | ............... 324/701 |
| 3,931,642 | A | * 1/1976 | Kugimiya et al. | ....... 360/125.01 |
| 2008/0141522 | A1 | * 6/2008 | Baer et al. | ............... 29/603.12 |

* cited by examiner

*Primary Examiner*—Paul D Kim
(74) *Attorney, Agent, or Firm*—Zilka-Kotab, PC

(57) ABSTRACT

A structure and method for performing magnetic inductance testing of write heads formed on a wafer. The structure and method allows for the effective inductive testing of magnetic write heads at wafer level even if the write heads have an inductance that is too low to be effectively measured directly. A test head is constructed having a structure similar to that of the write heads, but having a significantly higher magnetic inductance. The higher magnetic inductance of the write head can be provided by extending the shaping layer to or beyond the air bearing surface plane ABS. The inductance of the test head can be further increased by increasing the width of the portion of the shaping layer that extends to the ABS (ie. shaping layer throat) and by increasing the width of the write pole throat.

10 Claims, 12 Drawing Sheets

METHOD FOR MANUFACTURING A MAGNETIC HEAD FOR PERPENDICULAR MAGNETIC DATA RECORDING

FIELD OF THE INVENTION

The present invention relates to perpendicular magnetic recording and more particularly to a method for measuring inductance to test the performance of perpendicular magnetic write heads at wafer level.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider files over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

Spin valve sensors, also referred to as a giant magnetoresistive (GMR) sensors, have been employed for sensing magnetic fields from the rotating magnetic disk. Such a sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current there-through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer. The spin valve sensor operates based on the spin dependent scattering of electrons across the spacer layer. When the magnetizations of the pinned and free layer are parallel to one another the resistance across the spacer layer is minimal, and when the magnetizations are opposite, the resistance across the spacer is maximum. This change in resistance is used to read a magnetic signal from the magnetic medium.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In order to increase manufacturing throughput, decrease cost and improve write head quality it is necessary to test the quality of a write head at an early stage of manufacture. For example, it would be desirable to detect the presence of magnetic discontinuities in the magnetic yoke structure that would result in decreased magnetic performance. Furthermore, it would be desirable to make these detections while the write head is still incorporated in a wafer, before the write head has been sliced into rows of heads or into individual sliders.

Unfortunately, as the performance of magnetic write heads increases (and especially with the advent of perpendicular magnetic write heads having helical coil structures) previously employed testing techniques no longer provide useful data. Therefore, there is a strong felt need for a method of structure that can facilitate the effective quality testing of a high performance write head, such as a perpendicular write head having a helical coil structure. Such a method or structure would also preferably not result in significant additional cost or reduction in manufacturing throughput.

SUMMARY OF THE INVENTION

The present invention provides a method and structure for allowing inductance testing of write heads, even when the write heads have an inductance that is too low to be effectively measured directly. A test head is formed on a wafer along with a plurality of functional write heads. The test head is constructed to have an inductance that is significantly higher than that of the functional write heads so that it can be effectively measured.

The test head can be formed to have a structure similar to that of the functional write heads and can be formed in the same manufacturing steps (i.e. photolithography, material deposition, etc.) as those used to construct the functional write heads. The magnetic inductance can be increased by extending the shaping layer of the test head to or beyond the air bearing surface plane (ABS plane). This is compared with the functional write heads wherein the shaping layer terminates short of the ABS plane. The magnetic inductance of the test head can be further increased by increasing the width of the portion of the shaping layer that extends to the ABS (shaping layer throat) and also by increasing the width of the write pole throat.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
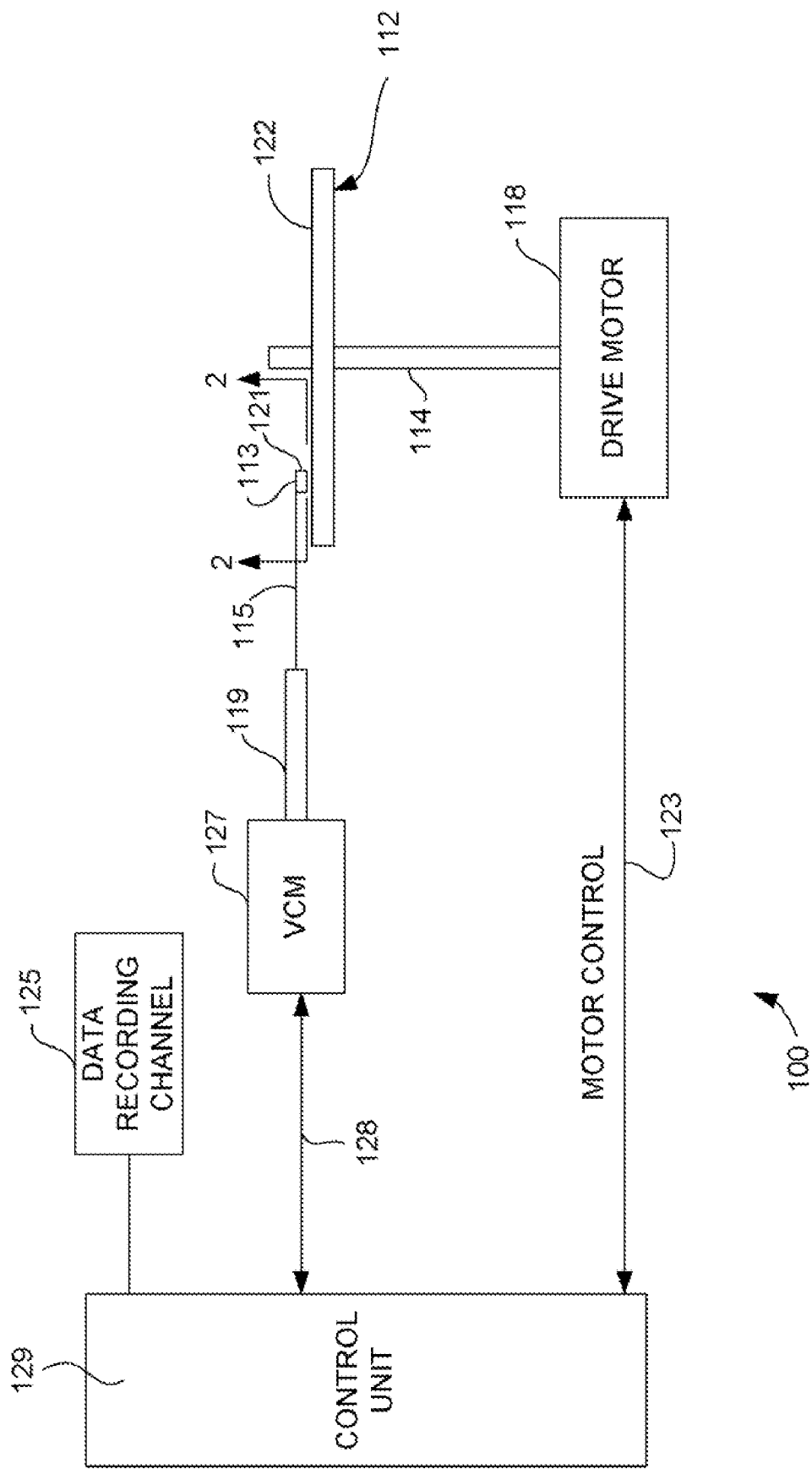
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
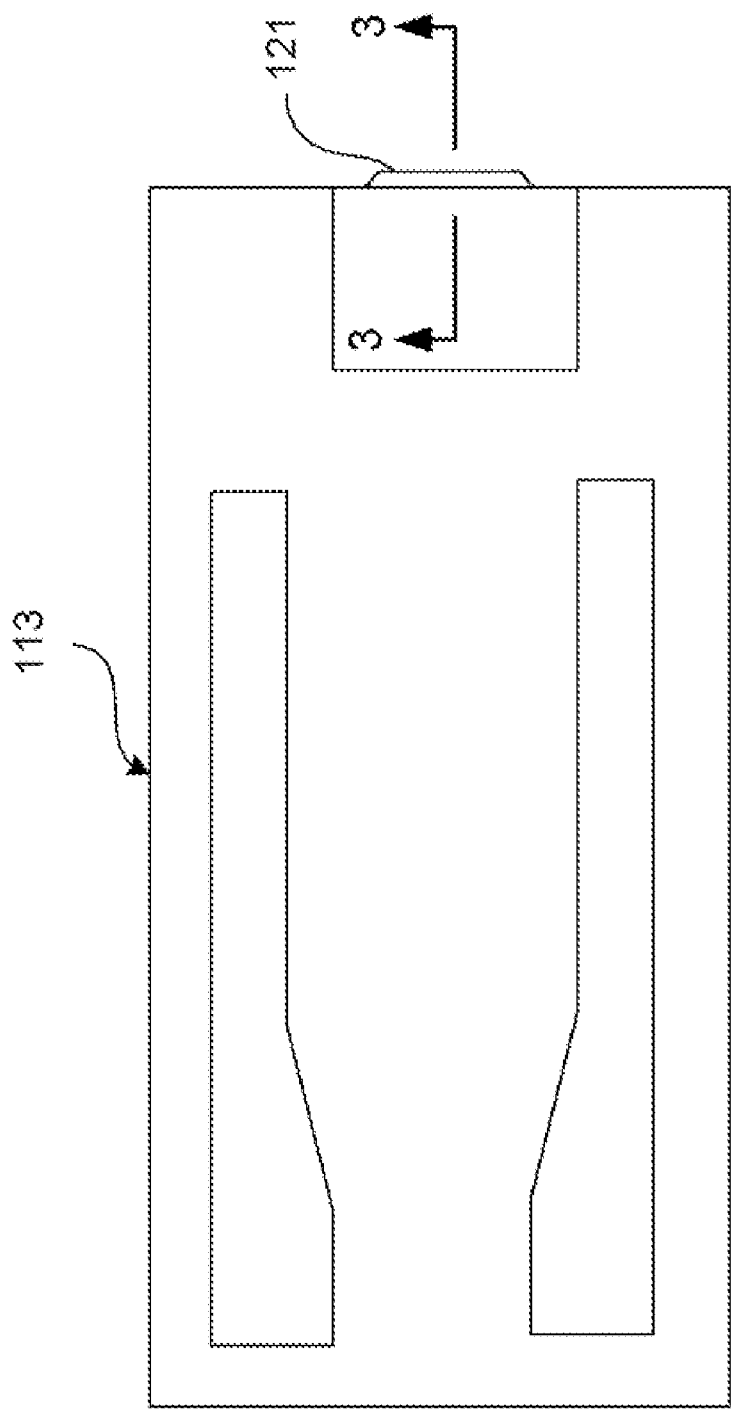
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen, the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
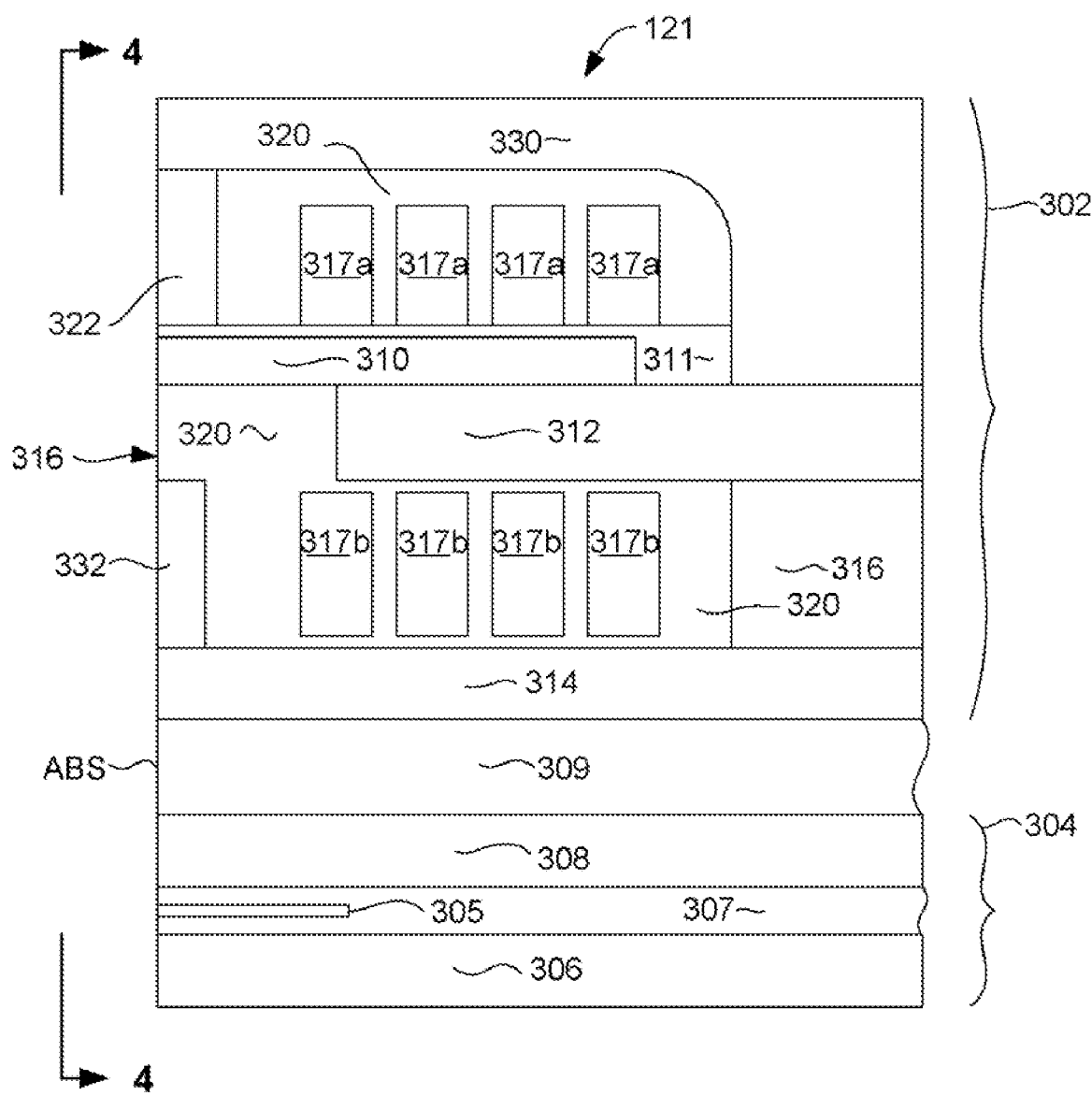
FIG. 3 is a cross sectional view, taken from line 3-3 of FIG. 2 and rotated 90 degrees counterclockwise, of a magnetic head according to an embodiment of the present invention.

With reference now to FIG. 3, the magnetic head 121 for use in a perpendicular magnetic recording system is described. The head 121 includes a write element 302 and a read element 304. The read element includes a magnetoresistive sensor 305, such as a current in plane giant magnetoresistive (CPP GMR) sensor. However, the sensor 305 could be another type of sensor such as a current perpendicular to plane (CPP) GMR sensor or, a tunnel junction sensor (TMR) or some other type of sensor. The sensor 305 is located between and insulated from first and second magnetic shields 306, 308 and embedded in a dielectric material 307. The magnetic shields 306, 308, which can be constructed of for example CoFe or NiFe, absorb magnetic fields such as those from up-track or down track data signals, ensuring that the read sensor 304 only detects the desired data track located between the shields 306, 308. A non-magnetic, electrically insulating gap layer 309 may be provided between the shield 308 and the write head 302.

Figure 4:
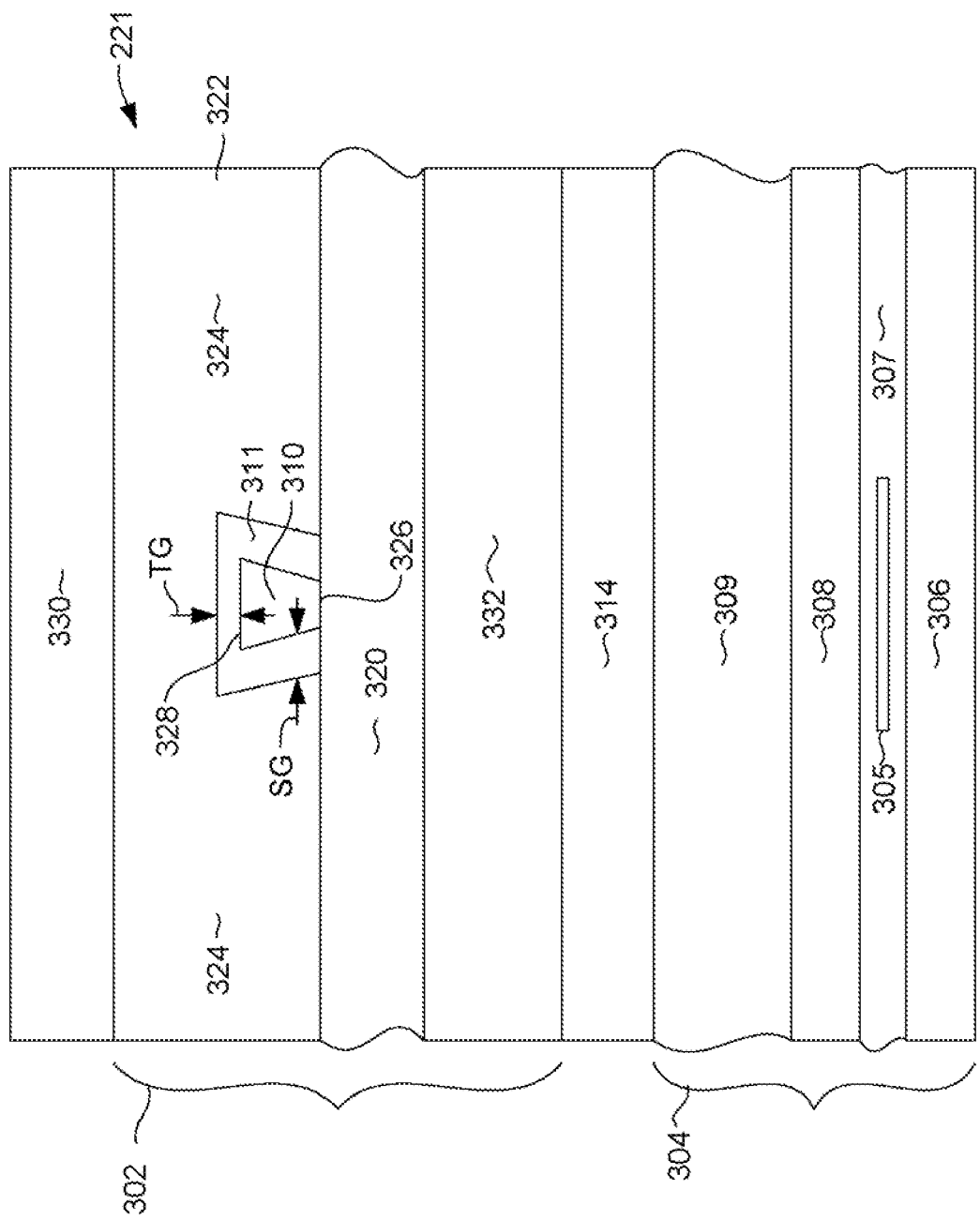
FIG. 4 is an ABS view of the write head taken from line 4-4 of FIG. 3.

With continued reference to FIG. 3, the write element 302 includes a write pole 310 that is magnetically connected with a magnetic shaping layer (also referred to as a stitched pole) 312, and is embedded within an insulation material 311. The write pole 310 has a small cross section at the air bearing surface (as seen in FIG. 4) and is constructed of a material having a high saturation moment, such as NiFe or CoFe. More preferably, the write pole 310 is constructed as a lamination of layers of magnetic material separated by thin layers of non-magnetic material. As can be seen in FIG. 3, the shaping layer 312 stops short of the air bearing surface ABS. The write element 302 also has a lower, or leading return pole 314 that preferably has a surface exposed at the ABS and has a cross section parallel with the ABS surface that is much larger than that of the write pole 310. The return pole 314 is magnetically connected with the shaping layer 312 by a back gap portion 316. The shaping layer 312, return pole 314 and back gap 316 can be constructed of, for example, NiFe, CoFe or some other magnetic material.

An electrically conductive helical write coil 317, shown in cross section in FIG. 3, wraps around the shaping layer 312 and write pole 310. The write coil 317, therefore includes upper portions, or leads, 317a that pass above (trailing) the write pole 310 and shaping layer 312 and lower portions, or lead, 317b that pass below (leading) the write pole 310 and shaping layer 312. The upper portions 317a are connected with the lower portions by connecting studs (not shown) in a region outside of the magnetic structures of the write head 302.

The write coil 317 is surrounded by an electrically insulating material 320 that electrically insulates the turns of the coil 317 from one another and electrically isolates the coil 317 from the surrounding magnetic structures 310, 312, 316, 314. When a current passes through the coil 317, the resulting magnetic field causes a magnetic flux to flow through the return pole 314, back gap 316, shaping layer 312 and write pole 310. This magnetic flux causes a write field to be emitted toward an adjacent magnetic medium (not shown in FIGS. 3 and 4). The insulation layers 320 can be constructed of a material such as alumina ($Al_2O_3$) or can be constructed as various layers of the same or different electrically insulating, non-magnetic materials.

With reference to FIG. 4, the write head element 302 may also include a trailing shield 322, which can be constructed of a magnetic material such as NiFe or some other material. With reference to FIG. 4, the trailing shield 322 is configured to wrap around the write pole 310 to provide side shielding as well as trailing shielding from stray magnetic fields. These stray magnetic fields can be from the write head 302 itself or could also be from adjacent track signals or from magnetic fields from external sources. The write pole 310 has a leading edge 326 and a trailing edge 328. The terms leading and trading refer to the direction of travel over the magnetic medium when the write head 221 is in use.

Therefore, the trailing shield 322 has side portions 324. These side portions each have a leading edge that extends at least to the leading edge 326 of the write pole 310 and which preferably extends beyond the leading edge 326 of the write pole 310. Extending the side portions 324 to or beyond the leading edge of the write pole, ensures that any side stray fields will be very effectively prevented from affecting the magnetic medium.

As can be seen, the trailing shield 322 is separated from the trailing edge 328 of the write pole 310 by a trailing gap (TG), and is separated from the laterally opposed sides of the write pole by a side gap (SG). The portion of the trailing shield 322 that is adjacent to the trailing edge 328 of the write pole 310 increases the field gradient of the write head. This is accomplished by drawing the write field toward this trailing portion of the trailing shield 322, which cants the write field a desired amount. Therefore, the write field is not perfectly perpendicular, but is canted somewhat in the trailing direction.

The trailing gap thickness TG involves a tradeoff. If the trailing gap TG is to large, field gradient will not be large enough. If the trailing shield gap TG is too small, and unacceptable amount of write field will be lost to the trailing shield, resulting in a weak write field. Therefore, the thickness of the trailing gap TG should be somewhat tightly controlled. The thickness of the side gaps SG is, however, not as critical. The side gaps SG are preferably larger than the trailing gap TG.

With reference still to FIG. 4, the write pole 310 preferably has a trapezoidal shape as viewed from the ABS. This trapezoidal shape, wherein the write pole 310 is narrower at the leading edge 326 than at the trailing edge prevents skew related adjacent track interference when the write head is located at inner and outer portions of magnetic disk (FIG. 1).

With reference still to FIGS. 3 and 4, the write head 302 also can include an upper or trailing return pole 330 constructed of a magnetic material such as NiFe or some other magnetic material. The trailing return pole can be configured to magnetically connect the trailing, wrap around shield 322 with the back gap shaping layer 312 and back gap structure 316 to conduct magnetic flux from the trailing shield 322. Alternatively, the trailing return pole could be omitted, in which case the trailing shield 322 would be floating (i.e. not magnetically connected with the other magnetic structures of the write head 302.

In addition, the write head 302 can include a magnetic pedestal 332. This magnetic pedestal can be attached to the leading return pole at the ABS end of the write head 302 and can extend toward, but not to, the write pole 310. This pedestal can be useful in preventing stray fields, such as those from the write coil 317 from inadvertently reaching the magnetic media.

With previous generation write heads, such as longitudinal write heads, inductance measurements have been a useful tool for determining write head quality at wafer level. The magnetic inductance of a write head could be measured while a write head was still incorporated on a wafer. If the inductance measurement was too high or to low, it could be determined that the head was defective in some way. For example, if a magnetic variation or discontinuity existed between various magnetic structures (for example between the back gap 316 and the shaping layer 312) this magnetic discontinuity or defect could be detected by measuring a change in the inductance of the write head 302. However, current or future generation write heads, such as the perpendicular write head described above have inductance values that are so low, that they cannot be measured in a useful way. In fact the inductance values of such perpendicular write heads having helical coil structures are so low that they are less than the variation between inductance measuring tools. This of course makes direct inductance measurement of the write head useless.

Figure 5:
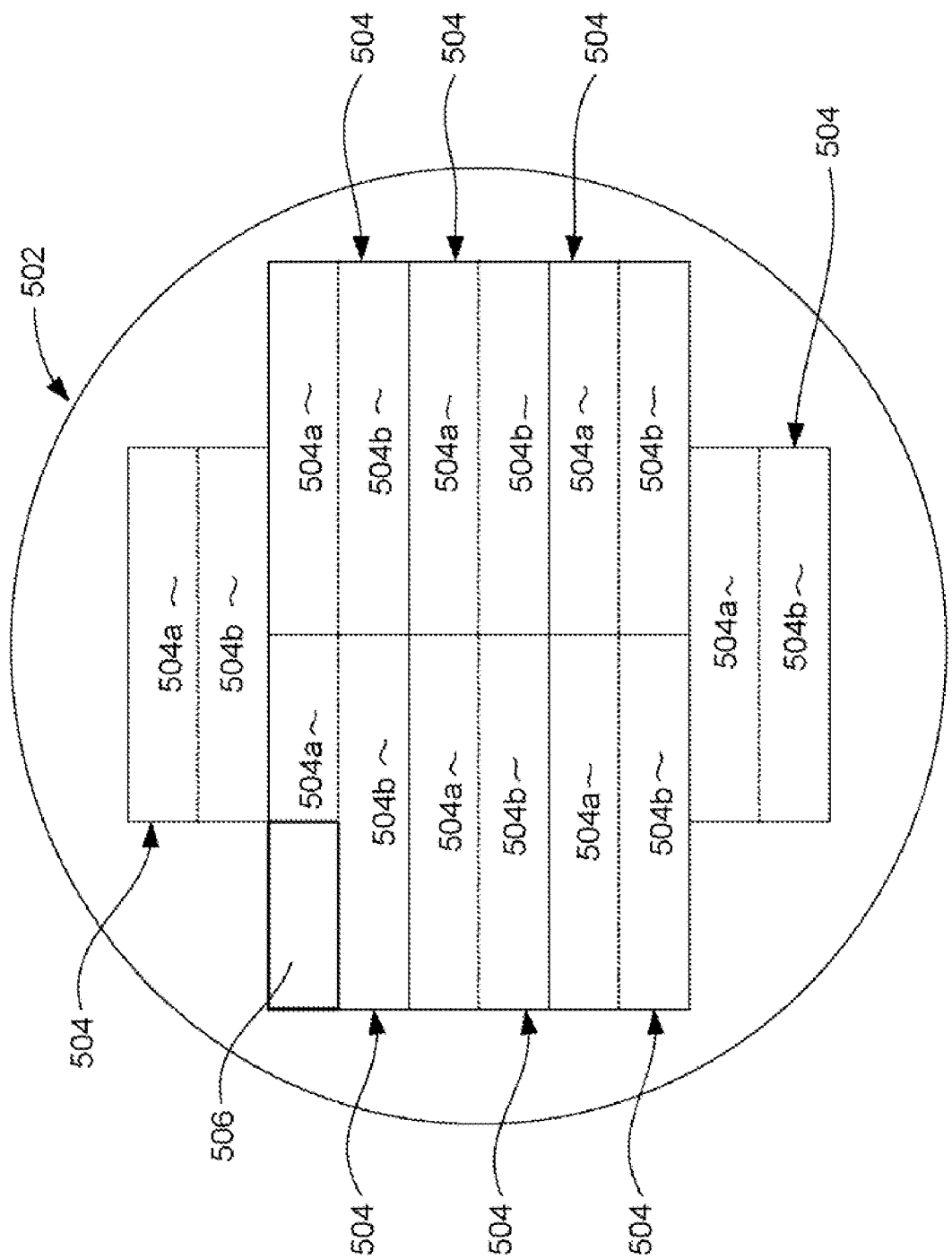
FIG. 5 is a top down view of a wafer on which a plurality of magnetic heads and at least one test head can be manufactured.

The present invention overcomes these limitations on inductance measurement, allowing useful inductance testing of write heads, even if those write heads are designed as low inductance perpendicular write heads having helical coil structures. With reference now to FIG. 5, magnetic heads are constructed on a wafer 502. The wafer can be divided into a plurality of sectors or quadrants 504. In some cases these quadrants can be divided further into half quadrants 504a, 504b. As those skilled in the art will appreciate, the heads are manufactured by photolithographic processes using a "stepper tool", which photographically patterns a portion of the wafer at a time, the patterned portion of the wafer being referred to as a flash field 506. For example, a photolithographic process may pattern a first flash field 506. This flash field 506 can cover, for example a half of a half quadrant 504a as shown in FIG. 5. After each photo step has been performed, the stepper tool moves to an adjacent portion of the quadrant 504 or other portion of the wafer 502 and the photolithographic pattern is repeated.

Figure 6:
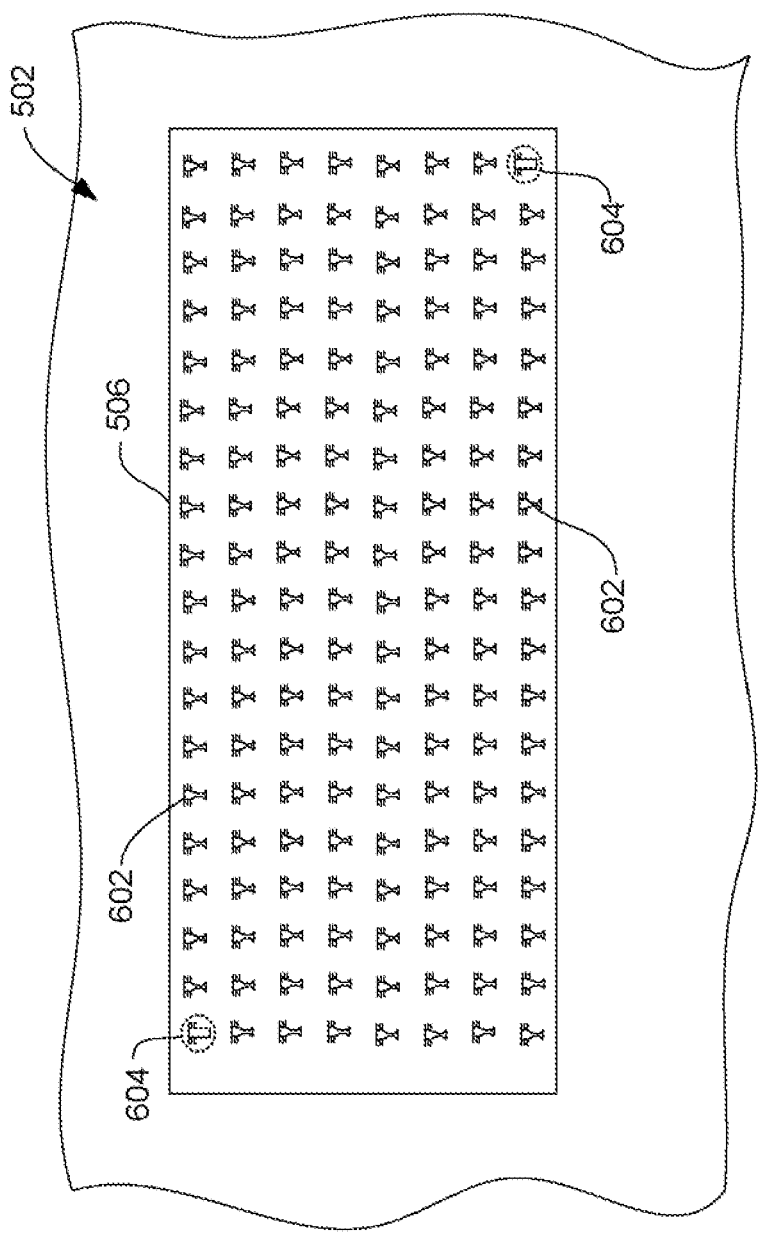
FIG. 6 is an enlarged view of a stepper flash field of a portion of the wafer.

With reference now to FIG. 6, an example of a flash field 506 is illustrated. The photolithographic processes along with various other processes such as material deposition, etching, ion milling, etc. form a series of many rows of magnetic heads 602 on the stepper portion 506 of the wafer 502. It should be pointed out that, although only about 150 such heads are shown, there would actually be thousands of heads 506 formed in a single flash field 506.

With continued reference to FIG. 6, along with the actual heads 602, one or more test heads 604 are formed as well on the wafer 302. The test heads 604 are shown surrounded by a dashed circle, however, this is only to help identify the test heads 604 in FIG. 6. The test heads may be arranged in any number or in any arrangement desired on the wafer 502. However, a beneficial arrangement is to form two test heads in a single flash field 506 with the test heads 604 being located at opposite corners of the flash field 506.

Figure 7:
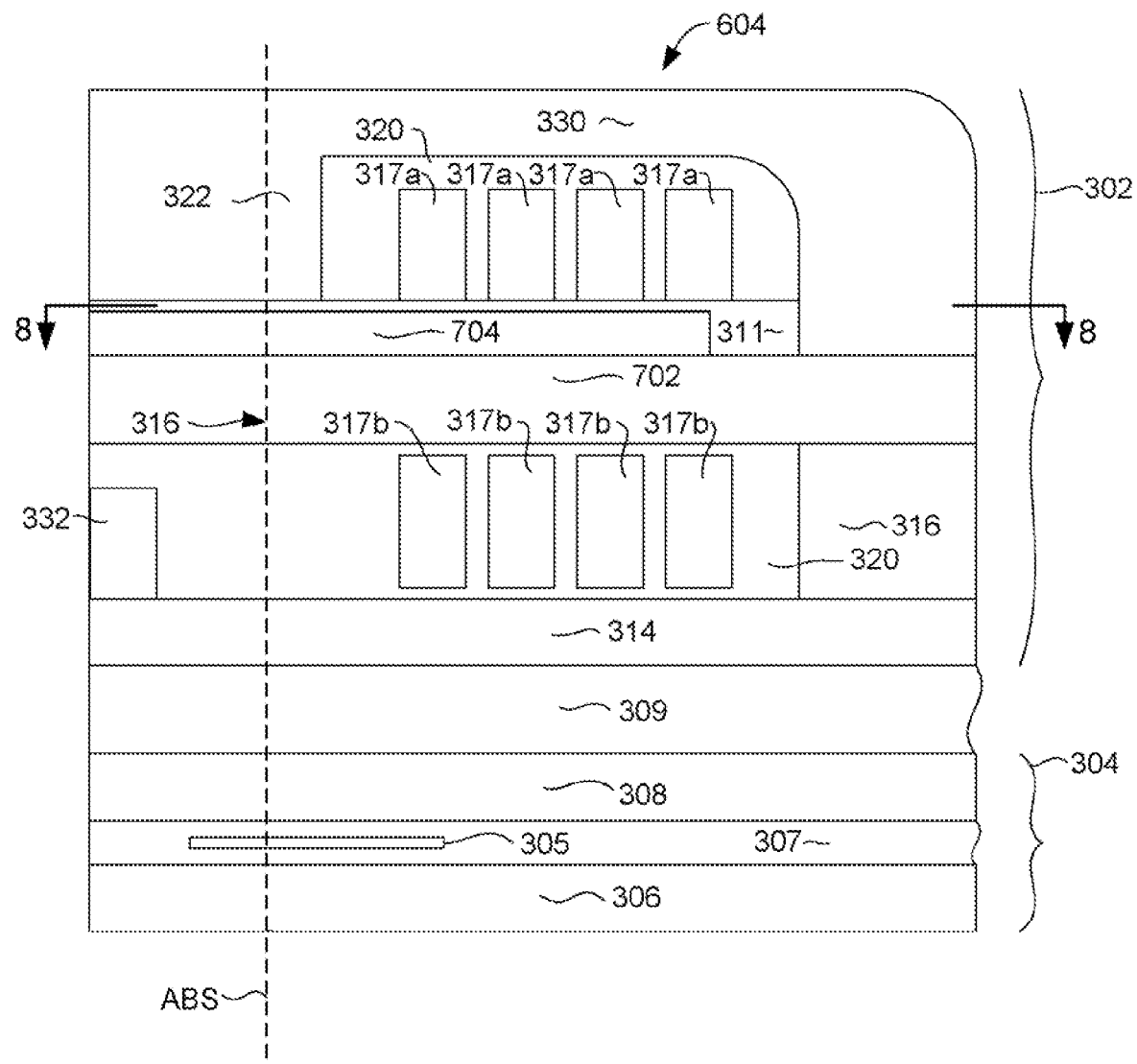
FIG. 7 is a side cross sectional view of a test head that can be formed on the wafer.

With reference now to FIG. 6, a side cross section of the test head 604 shows how the structure of the test head 604 can differ from that of the write head 302 described with reference to FIG. 3. As can be seen in FIG. 7, portions of the test head 604 extend beyond the ABS plane. This is because the test head 604 is being shown at wafer level. The actual ABS of the write head 302 as shown in FIG. 3 would be defined by slicing the wafer 504 into rows of sliders and then lapping until an ABS plane (designated as dashed line ABS in FIG. 7) has been reached. Therefore, as can be seen, various features of the test head 604 can actually extend beyond the ABS plane, as would many of the features of an actual head 506 (FIG. 5) prior to slicing and lapping.

However, referring back to FIG. 3, it was seen that the shaping layer of an actual head 302 stopped short of the ABS. This allows the magnetic flux to flow through the write head 310 so that the write head 310 can define the data bit. Therefore, in an actual write head 302, for 602 in FIG. 6), the shaping layer 312 would actually stop short of the ABS plane even before the slicing and lapping operations have been performed.

By contrast, with reference to FIG. 7, the shaping layer 702 can be seen to extend to or beyond the ABS plane (ABS). While this would not produce a functional write head, it is useful in increasing the magnetic inductance of the test head to a useful, measurable level as will be described in greater detail herein below.

Figure 8:
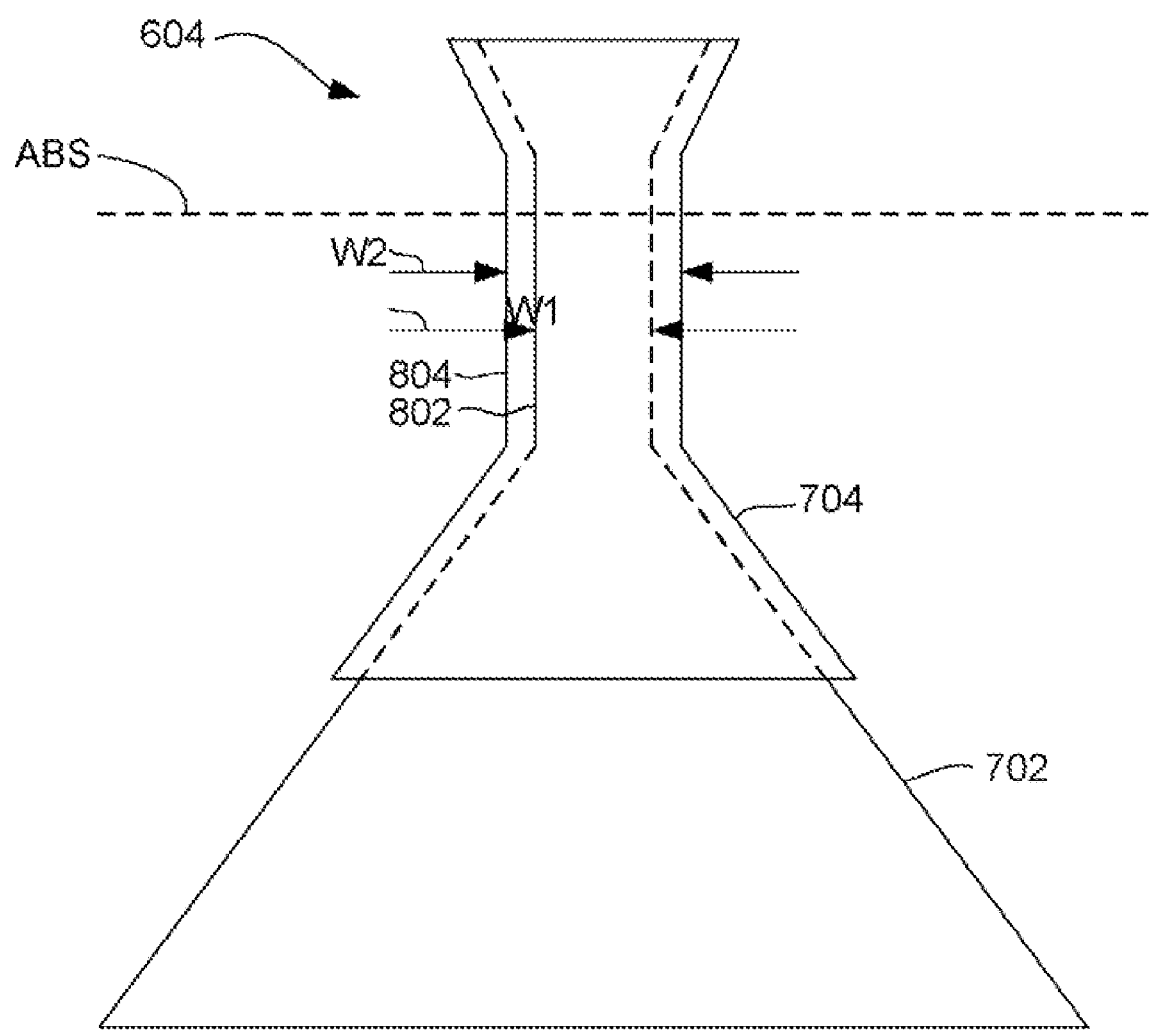
FIG. 8 is a top down view of a shaping layer and write pole of a test head formed on a wafer.

FIG. 8 shows a top down view of the shaping layer 702 and a write pole 704 of a test head 604. These structures 702, 704 are shown as viewed from section line 8-8 in FIG. 7. In FIG. 8 the portions of the shaping layer 702 that are hidden beneath the write pole 704 are shown in dashed line. In FIG. 8 it can be seen that the shaping layer 702 has a throat portion 802 that extends to or beyond the ABS plane. In an actual write head such as the head 302 of FIG. 3 (or 602 in FIG. 6) would stop short of the ABS and would not have the throat 802 extending to or beyond the ABS. The write head 704 is preferably slightly wider than the underlying shaping layer 702 in order to avoid manufacturing problems such as material re-deposition during the formation of the write pole 310 that would otherwise adversely affect the shaping layer 702.

As can be seen in FIG. 8, the throat 802 of the shaping layer has a width W1. In addition, the write pole 704 has a throat portion 804 with a width W2 that is preferably larger than W1. The inventors have found that forming the shaping layer 702 with a throat 802 that extends to the ABS increases the magnetic inductance of the test head 604 (FIG. 7). In addition, increasing the widths W1 and W2 of the throats 802, 804 of the shaping layer 702 and write pole 704 also further increases the magnetic inductance of the test head. Furthermore, these increases in inductance are considerable and raise the inductance to such a value that it can be accurately measured by currently available inductance measuring tools.

Figure 9:
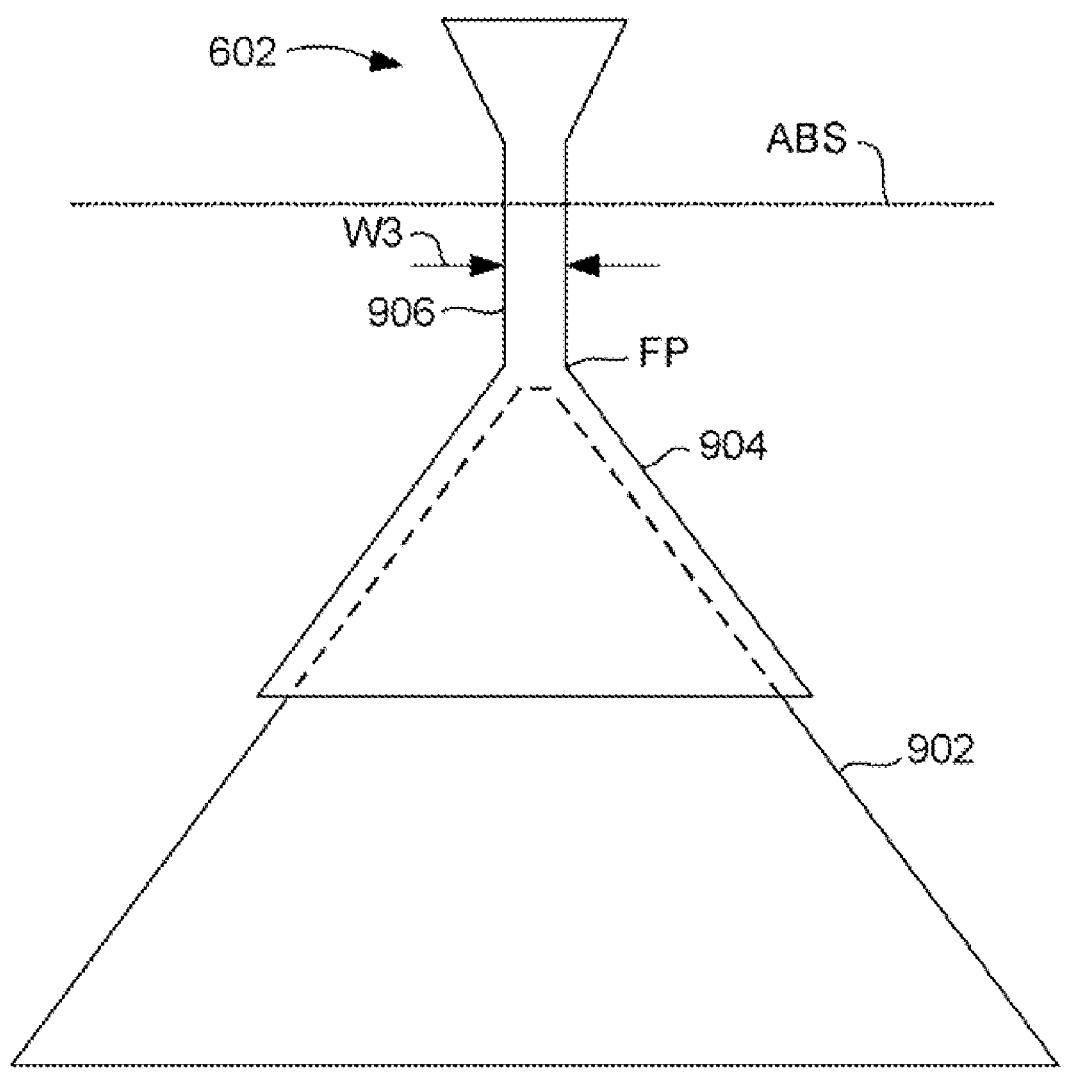
FIG. 9 is a top down view of a shaping layer and write pole of a functional head formed on a wafer.

To better appreciate the significance of the throat height widths W1, W2 described with reference to FIG. 4, the shaping layer 702 and write pole 704 of the test head 604 can be compared with those of an actual, functioning head 602. With reference then to FIG. 9, a shaping layer 902 and overlying write pole 904 are shown. The shaping layer 902 and write pole 904 correspond to the shaping layer 312 and write pole 310, but are shown prior to slicing and lapping. As can be seen, the shaping layer does not extend to the ABS plane, and may not have a throat portion at all. The shaping layer may terminate at some point near the flare point FP of the write pole 904. The write pole has a throat 906 with a width W3 that is significantly smaller that the widths W1 and W2 of the shaping layer 702 and write pole 704 of the test head 604 (FIG. 8). In fact the throat 906 of the write pole 904 of the functional head 602 can have a width W3 that is 50-150 nm, whereas the width W2 of the write pole throat 804 in the test head 604 can be 2-20 um. The width W1 of the shaping layer throat 802 can be 0.5 to 18 um.

The presence of the test head 604 in the wafer, therefore, allows an inductance measurement to be effectively performed at wafer level, even if the actual write heads 602 (FIG. 6) have inductance values that are too low to be accurately measured. If, for example, there is a manufacturing problem (such as a photo misalignment or inadequate etching step) during the fabrication of the actual write heads 602 on the wafer, the associated defects would also affect the test head. However, because the test head has a much higher nominal magnetic inductance, these defects can be detected by measuring the magnetic inductance of the test head 604. This magnetic inductance of the test head 604 can be measuring by connecting inductance measuring test equipment with the coil 317 of the test head 604.

Figure 10:
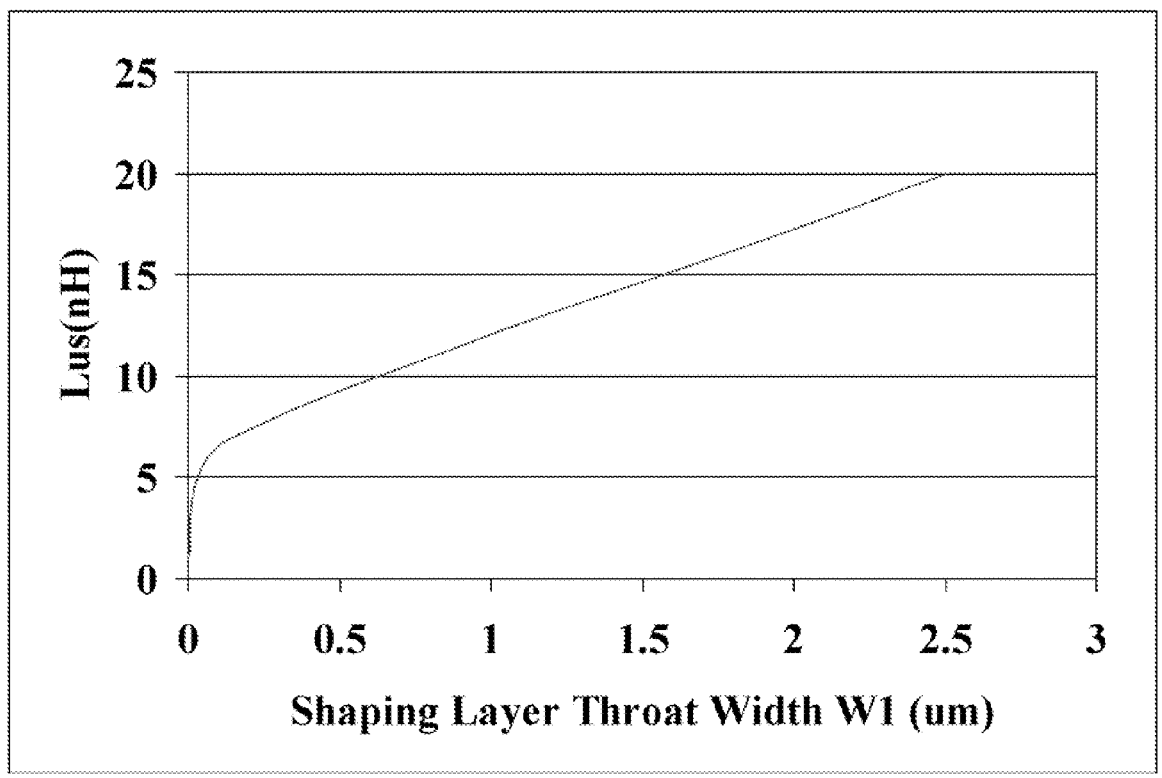
FIG. 10 is a graph illustrating a relationship between head inductance and shaping layer throat width.
Figure 11:
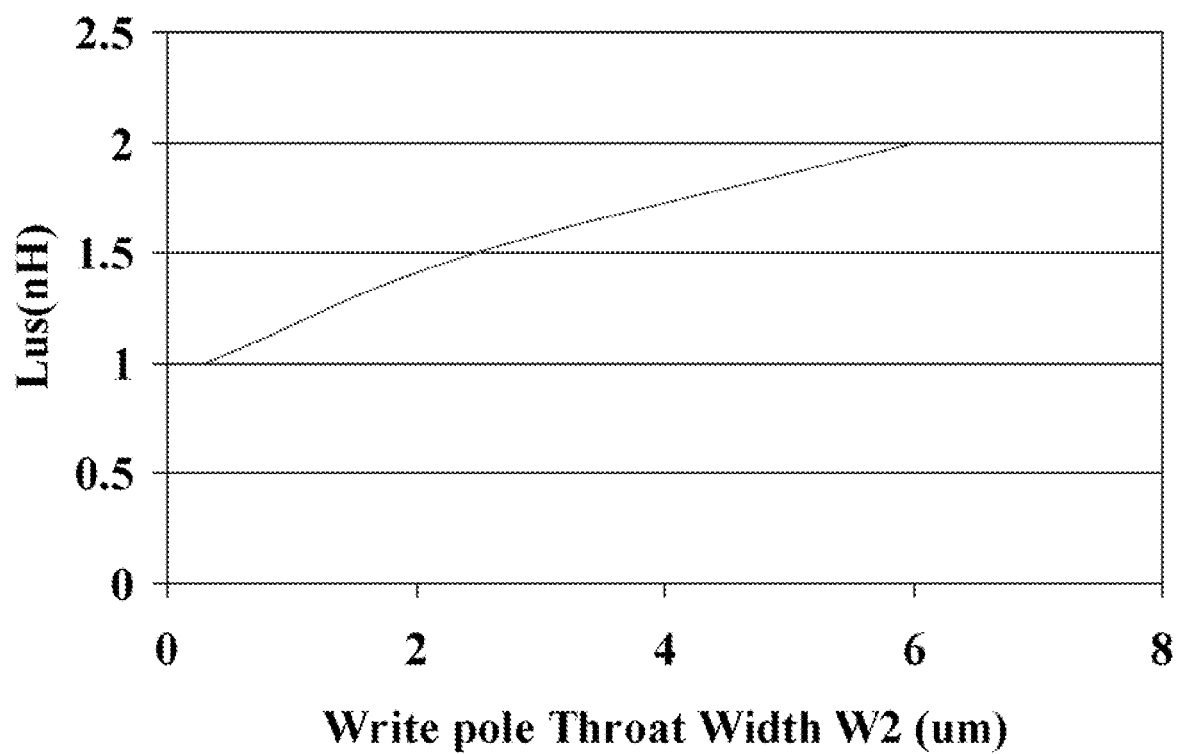
FIG. 11 is a graph illustrating a relationship between write pole throat width.

As mentioned above, increasing the widths W1, W2 of the shaping layer 702 and write head 704 of the test head 604 increases the inductance of the test head 604. With reference now to FIG. 10, a graph of the relationship between shaping layer throat height W1 and magnetic inductance shows that the inductance of the test head 604 increases substantially linearly with increasing shaping layer throat width W1. With reference to FIG. 11, a similar result can be found for the relationship between write pole throat width W2 and inductance. Although it is not exactly a linear increase, it can be seen that the inductance of the test head increases with increasing write pole throat width W2.

Figure 12:
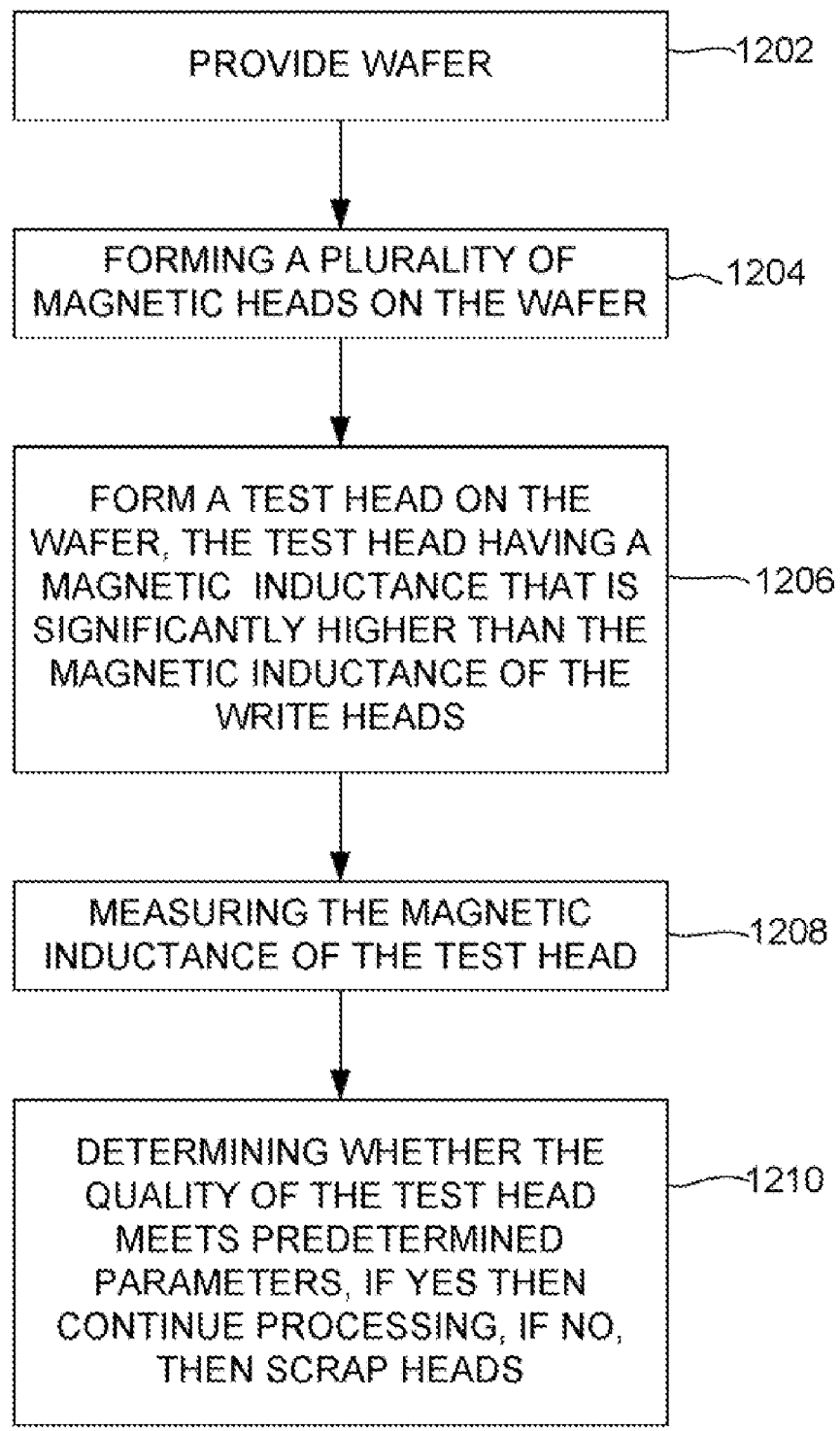
FIG. 12 is a flow chart illustrating a method of manufacturing magnetic heads according to an embodiment of the invention.

FIG. 12 summarizes a method for using a test head to allow for inductance testing for a wafer of magnetic head. In a step 1202 a wafer is provided, and in a step 1204 a plurality of magnetic heads are formed on the wafer. In a step 1206 at least one test head is formed on the wafer. The plurality of magnetic heads and the test head are formed at the same time in common manufacturing steps (i.e. steps 1204 and 1206 are performed concurrently). Then, in a step 1208 the inductance of the test head is measured. This can be accomplished by connecting an inductance testing tool with coil contacts of the test head. Since the inductance of the test head is significantly larger than that of the functional magnetic heads, the inductance of the test head can be effectively measured even if the functional heads have an inductance that is too low to measure with any effectiveness. Then, in a step 1210 a determination is made as to whether the measured inductance of the test head is within a predetermined range. If the inductance is within the predetermined range, then manufacturing continues. For example, the wafer can be sliced into rows of sliders, lapped to form the ABS, and then cut into individual sliders. If the inductance is not within a predetermined range, then further testing and analysis can be performed to determine whether the heads are faulty and why. If the quality of the heads is not acceptable, then all or a portion of the wafer and associated heads can be scrapped.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic head for perpendicular magnetic data recording, comprising:
   providing a wafer;
   forming a functional perpendicular magnetic write head on the wafer, the perpendicular magnetic write head further comprising:
      a magnetic shaping layer terminating short of an air bearing surface plane (ABS plane); and
      a magnetic write pole formed on the magnetic shaping layer and extending at least to the ABS plane; and
   forming a test head on the wafer, the test head further comprising:
      a test head magnetic shaping layer extending at least to the ABS plane; and
      a test head magnetic write pole formed on the test head magnetic shaping layer and extending at least to the ABS plane.

2. The method as in claim 1 further comprising, after forming the functional magnetic write head and test head on the wafer, measuring an inductance of the test head.

3. The method as in claim 1 further comprising, after forming the functional magnetic write head and test head on the wafer, measuring an inductance of the test head to determine whether the inductance of the test head falls within a predetermined acceptable range, and if the test head does fall within the predetermined range, continuing manufacturing.

4. The method as in claim 1 further comprising, after forming the write head and test head on the wafer, measuring an inductance of the test head to determine whether the inductance of the test head falls within a predetermined acceptable range, and if the test head does not fall within the predetermined range, performing quality analysis of the functional magnetic write head.

5. The method as in claim 1 wherein the test head shaping layer has a first width W1 at the ABS plane, the test head write pole has a second width W2 at the ABS plane, and the write pole of the functional magnetic write head has a third width W3 at the ABS plane, and wherein W1 and W2 are each larger than W3.

6. The method as in claim 5 wherein W2 is larger than W1.

7. The method as in claim 1 further comprising forming a helical, non-magnetic, electrically conductive write coil in the functional magnetic write head and in the test head.

8. The method as in claim 1, wherein:
   the magnetic test head shaping layer has a throat section having a first width and extending to the ABS; and
   the write pole of the functional magnetic write head has a throat section with a second width that is smaller than the first width.

9. The method as in claim 1, wherein:
   the magnetic test head shaping layer has a throat section having a width of 0.5-18 um and extending to the ABS.

10. The method as in claim 1, wherein:
    the magnetic test head shaping layer has a throat section having a width of 0.5-18 um and extending to the ABS; and
    the write pole of the functional magnetic write head has a throat section with a width of 50-150 nm.

* * * * *